United States Patent [19]
Lyke et al.

[11] Patent Number: 6,018,451
[45] Date of Patent: Jan. 25, 2000

[54] CIRCUIT BREAKER TRIP UNIT AND METHOD FOR REAL-TIME FAULT INDICATION

[75] Inventors: Andrew J. Lyke, Atlanta; John L. Culligan, Alpharetta; Scott C. Turner, Lilburn; James O. Alexander, Atlanta, all of Ga.

[73] Assignee: Siemens Energy & Automation, Inc., Alpharetta, Ga.

[21] Appl. No.: 09/161,837

[22] Filed: Sep. 28, 1998

[51] Int. Cl.[7] ............................................. H02H 3/00
[52] U.S. Cl. ........................ 361/93.2; 361/42; 702/58
[58] Field of Search ............................ 361/93.1, 93.2, 361/93.3, 42, 47; 324/509, 512, 522, 532, 535; 702/58, 59, 60, 64

[56] References Cited

U.S. PATENT DOCUMENTS

| | | |
|---|---|---|
| 4,612,617 | 9/1986 | Laplace, Jr. et al. . |
| 4,631,625 | 12/1986 | Alexander et al. . |
| 5,335,135 | 8/1994 | Kinney . |
| 5,426,592 | 6/1995 | Leone et al. . |
| 5,451,879 | 9/1995 | Moore ........................................ 324/418 |
| 5,455,505 | 10/1995 | Laplace et al. . |
| 5,490,086 | 2/1996 | Leone et al. . |
| 5,498,956 | 3/1996 | Kinney et al. . |
| 5,500,806 | 3/1996 | Bellin et al. . |
| 5,568,398 | 10/1996 | Trainor . |
| 5,596,263 | 1/1997 | Zavis et al. . |
| 5,617,286 | 4/1997 | Jenkins . |
| 5,825,643 | 10/1998 | Dvorak et al. ........................ 364/140 |

OTHER PUBLICATIONS

R.H. Stillman et al., "The Application of Supervisory Control and Data Acquisition to a Rural–Provincial Power System", IE Aust. & IREE Aust., vol. 4, No. 2, Jun. 1984, pp. 170–176.

"Instructions for ALTI and ALTIP Trip Indicators and Alam and Alamp Ammeter/Trip Indicator", Square D Company, pp. 1–3, Jun. 1992.

*Primary Examiner*—Michael J. Sherry

[57] ABSTRACT

A logging device for a trip unit records temporal information related to a circuit breaker trip event, with the circuit breaker (11) including a trip unit (12). The device (10) includes at least a clock circuit (13), a microcontroller (14), and a storage medium (15). The device (10) can be configured as either a plug-in module for the trip unit (12), or as an accessory is mounted on the panel proximate to and in communication with the trip unit (12). The clock circuit (13) generates signals representing temporal information, such as real-time date and time information. The microcontroller (14) is adapted to be coupled to the trip unit (12) to receive signals from the trip unit (12). These signals from the trip unit (12) indicate a circuit breaker trip event. The microcontroller (14) receives the time and date information from the clock circuit (13) and associates a given trip event with the time and date information related to that given trip event. The microcontroller (14) then generates output signals representing the given trip event and the temporal information associated with that given trip event. The storage medium (15) is coupled to the microcontroller (14), and receives and stores the output signals from the microcontroller (14). These output signals indicate the given trip event and the time and date information associated with the given trip event. The storage medium (15) records the output signals for review by an operator.

20 Claims, 3 Drawing Sheets

CIRCUIT BREAKER TRIP UNIT AND METHOD FOR REAL-TIME FAULT INDICATION

BACKGROUND

The instant invention pertains generally to circuit breaker trip units, and specifically to the reporting and logging of circuit breaker trip events.

A common accessory in the circuit breaker industry is a circuit breaker trip unit, which electronically monitors the circuit breaker with which it is associated. When the circuit breaker trips due to an overcurrent, the trip unit can indicate the cause of the trip and the relative overcurrent. This indicated cause of trip can be used to diagnose the circuit fault that caused the breaker trip.

Known circuit breaker trip units typically do not include a real-time clock. Accordingly, it is not generally possible for known trip units to produce a log recording the time at which a given circuit breaker trip event occurred. Such a time record would be useful to analyze and diagnose the fault, as well as to take action on processes or devices that may have been interrupted or affected by the circuit interruption. Accordingly, a need exists in the art for a circuit breaker trip unit with a capability to generate a time-stamped record or log containing entries for each circuit breaker trip event.

SUMMARY

The present invention meets the above need in the art by providing a device for recording temporal information related to a circuit breaker trip event, with the circuit breaker equipped with a trip unit. The device comprises at least a clock circuit, a microcontroller, and a storage medium. The device can be configured as either a plug-in module for the trip unit, or as an accessory that is mounted on the panel proximate to and in communication with the trip unit.

The clock circuit generates signals representing temporal information, such as real-time date and time information. The microcontroller is adapted to be coupled to receive signals from the trip unit indicating a circuit breaker trip event. The microcontroller is coupled to the clock circuit to receive the temporal information, and associates a given trip event with the temporal information related to that given trip event. The microcontroller then generates output signals representing the given trip event and the temporal information associated with that given trip event. The storage medium is coupled to receive and store the output signals from the microcontroller. These output signals indicate the given trip event and the temporal information associated with the given trip event.

DETAILED DESCRIPTION OF THE INVENTION

Figure 1:
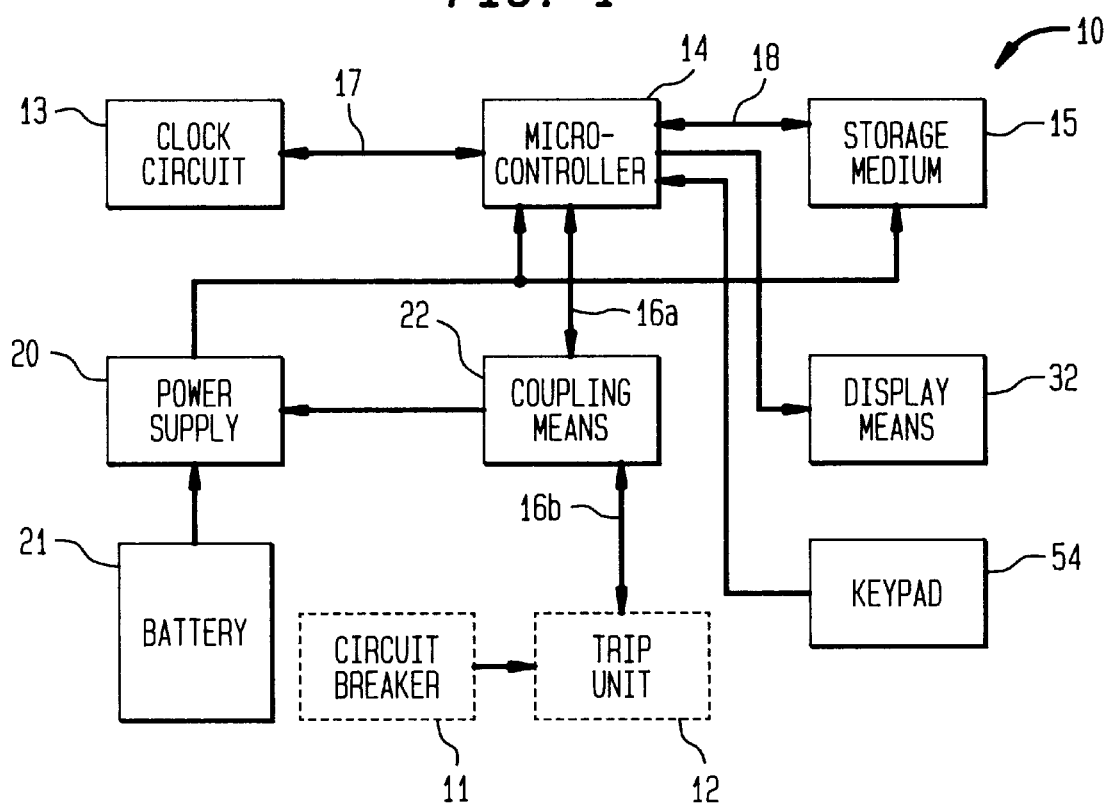
FIG. 1 is a block diagram of an exemplary embodiment of the invention.

FIG. 1 is a block diagram of an exemplary embodiment of the invention, a device 10 for recording temporal information related to a trip event of a circuit breaker 11 equipped with a trip unit 12. Circuit breaker 11 and trip unit 12 are shown in dashed outline because they represent the operational environment of the device 10, rather than being part of the device 10. The device 10 comprises at least a clock circuit 13, a microcontroller 14, and a storage medium 15. The device 10 can be configured as either a plug-in module for the trip unit 12, or as an accessory that is mounted on the breaker panel (not shown) proximate to and in communication with the trip unit 12.

The clock circuit 13 generates signals representing temporal information, and preferably generates signals representing a time and a date. Clock circuit 13, as discussed further below in connection with FIG. 3, includes a resonant crystal oscillator and the timing generation circuitry necessary to convert the pulses from the oscillator into a representation of a real-time clock. The term "real time clock" in the context of this invention means a clock circuit that maintains time-of-day and date parameters. The term "real time clock" does not refer to the clock signals generated by resonant crystal oscillator circuits.

The microcontroller 14 is adapted to be coupled to the trip unit 12 to receive signals from the trip unit 12 via lines 16a and 16b. These signals may include signals representing the current flowing in one or more phases of the circuit monitored by the circuit breaker 11, the ground fault current, the breaker settings, the trip unit type, and the trip unit status. The trip unit status indicates a circuit breaker trip event. When the circuit breaker 11 trips, the trip unit status indicates the type of fault causing the trip. Typically, the indicated fault is one of a long time fault, a short time fault, an instantaneous fault, and a ground fault.

The microcontroller 14 is coupled to the clock circuit 13 to receive the temporal information on line 17. The microcontroller 14 associates a given trip event with the temporal information currently provided on line 17 and transmits the associated signals on line 18. The microcontroller 14 then generates output signals representing the given trip event and the temporal information associated with that given trip event. In this manner, the microcontroller 14 combines the trip event with the real-time at which the trip event occurred, rather than reporting the trip event alone. Line 17 is shown as a bidirectional line, since clock circuit 13 can be set using microcontroller 14.

The storage medium 15 is coupled by line 18 to the microcontroller 14, and receives and stores the output signals from the microcontroller 14. These output signals indicate the given trip event and the temporal information associated with the given trip event. Line 18 is shown as a bi-directional line, because microcontroller 14 also reads data representing trip events from storage medium 15.

Display means 32 and keypad 54 are coupled to microcontroller 14 to provide a user interface. Specifically, display means 32 allows the user to view data stored in storage medium 15, and keypad 54 allows the user to input data into microcontroller 14. Display means 32 and keypad 54 are described in more detail below in connection with FIG. 3.

A power supply 20 is coupled to the microcontroller 14 and to the storage medium 15. The power supply 20 is coupled to receive power from the trip unit 12 through coupling means 22 when the circuit breaker 11 is closed. In this manner, the power supply 20 receives power from the current transformers within the circuit breaker 11. The power supply 20 is also coupled to receive power from a back-up battery 21 when the circuit breaker 11 is open, so that the microcontroller 14 and the storage medium 15 receive power from the power supply 20 regardless of the status of the circuit breaker 11. In this manner, the battery 21 maintains the operation and integrity the microcontroller 14 and the storage medium 15. The clock circuit 13 and the storage medium 15 may be implemented with the microcontroller 14 on a single integrated circuit (IC) for convenience. A suitable IC for this purpose is the MICROCHIP PIC16C77.

Means 22 are provided for coupling the microcontroller 14 to the trip unit 12. These coupling means 22 either configure the device 10 as a plug-in module for selectively coupling the device 10 directly to the trip unit 12 or allow the device 10 to be mounted on the breaker panel (not shown) proximate the trip unit 12. If the device 10 is configured as a plug-in module, then the coupling means 22 desirably places the trip unit 12 in close physical contact with and in electrical communication with the device 10 so that the device 10 and the trip unit 12 readily exchange signals with minimal interference. The coupling means 22 enables the device 10 to snap, affix, or otherwise connect directly to the trip unit 12. Otherwise, if radio-frequency interference (RFI) from excessive arcing or plasma discharge associated with breaker trips are a design concern for the device 10, then the device 10 may be mounted on the breaker panel housing (not shown) some distance away from the circuit breaker 11. In this manner, the device 10 is separated from potential sources of interference, yet still communicates effectively with the trip unit 12. The exemplary trip unit 12 and the device 10 utilize digital serial communication, such as TTL-compatible, non-inverted 9600 baud serial communication, and the coupling means 22 includes the connectors and conductors (not shown) necessary to mechanically affix the device 10 and to implement the serial communication.

Figure 2:
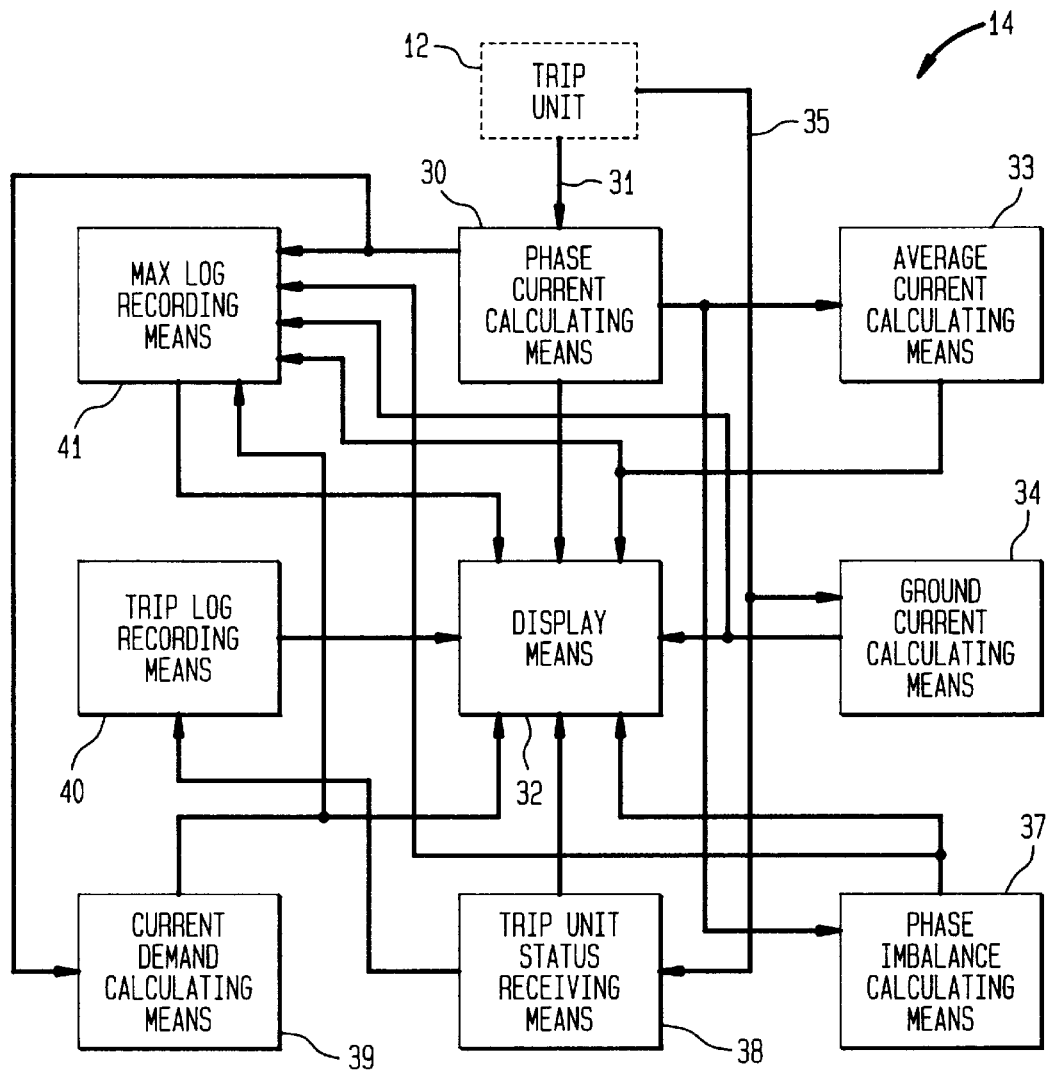
FIG. 2 is a block diagram of various functions and features of the microcontroller.

FIG. 2 is a functional block diagram which shows various components of the microcontroller 14. It is contemplated that the functions shown in FIG. 2 may be implemented as software or as a combination of hardware and software. According to further aspects of the invention as illustrated in FIG. 2, the microcontroller 14 provides means 30 for calculating the phase current passing through the circuit breaker 11, with which trip unit 12 is associated. An exemplary trip unit 12 monitors a circuit including one or more phases, with a three-phase circuit being typical. As in FIG. 1, the trip unit 12 is shown in dashed outline to indicate its status as part of the operating environment of the device 10. The trip unit 12 repeatedly transmits a signal on line 31 indicating the current flowing through each one of the phases, with an exemplary transmission interval being every two seconds. An exemplary signal is an integer in ASCII format representing the average of the squares of the current flow. To calculate an RMS value of the current flow, the microcontroller 14 is programmed or otherwise configured to convert the integer from ASCII to decimal, and to take the square root of the decimal value. The result is multiplied by the rating of circuit breaker 11 divided by 100, and is adjusted depending on whether the signal from the trip unit 12 is amplified. A signal representing the calculated phase current is directed to a suitable display means 32 and also to max log recording means 41 and average current calculating means 33, which are described below.

Display means 32, coupled as shown in FIG. 2, is provided for displaying the RMS value of the phase current passing through the circuit breaker 11, as calculated above. Exemplary display means 32 includes an LCD display that is updated each time new data is received from the trip unit 12. Also, if an exemplary time period, such as 2.5 seconds, passes with no signal from the trip unit 12, the microcontroller 14 causes display means 32 to display an error message indicating that the trip unit 12 is not communicating.

The microcontroller 14 provides means 33 for calculating the average current passing through the circuit breaker 11, with which trip unit 12 is associated. For example, given a three-phase circuit, the microcontroller 14 sums the RMS values of the currents flowing through each of the three phases, and divides the sum by three to produce an average. This calculation is repeated each time the trip unit 12 sends new data. Display means 32 displays the calculated average current passing through the circuit breaker 11. Average current calculating means 33 receives as input a signal representing the phase current(s) from phase current calculating means 30.

The microcontroller 14 provides means 34 for calculating the ground current passing through the circuit breaker 11, with which trip unit 12 is associated. The trip unit 12 periodically transmits on line 35 a signal indicating the average of the squares of the ground fault current samples. An exemplary signal on line 35 represents an integer in ASCII format. The microcontroller 14 computes an RMS value by converting the ASCII integer to decimal format and then taking the square root of the decimal value. The result is multiplied by the rating of circuit breaker 11 divided by 100, and is adjusted depending on whether the signal from the trip unit 12 is amplified. The calculated ground current is then displayed on the display means 32.

The microcontroller 14 provides means 37 for calculating the phase imbalance of the circuit monitored by the circuit breaker 11, that is, the difference between the current flowing in each phase of the circuit being monitored and the average current flowing all three phases. For a typical three-phase circuit, the microcontroller 14 computes the difference between the current flowing in each phase and the average current, takes the absolute value of this difference, divides the result by the average current, and multiplies by 100 to arrive at a percentage. The results are displayed on the display means 32. For convenience, only the phase having the highest phase imbalance is selected for display on the display means 32. As input, the phase imbalance calculating means 37 receives the signal representing the phase current(s) from the phase current calculating means 30.

The microcontroller 14 provides means 38 for receiving a status message from the trip unit 12. The status messages typically indicate whether the trip unit 12 is operating normally or is in overload. The trip unit 12 periodically transmits status messages, for example every 0.4 seconds. The microcontroller 14 analyzes this signal to determine whether the circuit breaker 11 is in overload, and displays the status of the trip unit 12 on the display means 32. The trip unit status receiving means 38 is coupled to provide an output signal representing the status of the trip unit 12 to display means 32 and to time log recording means 40.

The microcontroller 14 provides means 39 for calculating the current demand in the circuit monitored by the circuit breaker 11 and trip unit 12 over a given demand period, for example a 15 minute period. The microcontroller 14 calculates the current demand within the demand period by averaging the three phase currents over a given time period, such as a minute, and then summing each time a new value is calculated. A new value is calculated periodically, for example every minute. When a new value is calculated, the sum is updated, and the microcontroller 14 divides the sum by the elapsed time of the demand period. The current demand is displayed on the display means 32. As input, the current demand calculating means 39 receives the signal representing the phase current(s) from the phase current calculating means 30.

The microcontroller 14 provides means 40 for recording a time-stamped trip log indicating at least one circuit breaker trip event along with a time-stamp associated with each circuit breaker trip event. This trip log is recorded in storage medium 15 and is preferably configured as a LIFO (Last In, First Out) list containing the cause of trip, and the date and time of the trip. An exemplary storage medium 15 is a volatile RAM. Where it is necessary to conserve RAM resources, the trip log is limited to a given number of entries, such as five. In an exemplary embodiment, the trip log is accessed by a user through a menu system, and is displayed on the display means 32. As input, the trip log recording means 40 receives the signal representing the status of the trip unit 12 from trip unit status receiving means 38.

The microcontroller 14 provides means 41 for recording a log containing maximum values for several circuit parameters, such as the phase current from means 30, the average phase current from means 33, the ground fault current from means 34, the phase unbalance from means 37, and the current demand from means 39, or others as calculated above. Like the trip log recorded by recording means 40, this log of maximum values is recorded on storage medium 15, which is preferably a volatile RAM. Where it is necessary to conserve RAM resources, the log of maximum values is restricted to a subset of the above parameters. In the exemplary embodiment of the invention this log of maximum values is accessed by a user through a menu system, and is displayed on a the display means 32. The entries in the log of maximum values may also be time-stamped with temporal information related to each entry. In this manner, the log of maximum values may provide a historical record of the circuit conditions leading up to a circuit breaker trip event.

When the circuit breaker 11 trips on long time, short time, instantaneous trip, or ground fault, the trip unit 12 transmits a final status message just before it transmits a signal indicating that the circuit breaker 11 has tripped. This final status message can occur at any time, not just at the 0.4 second interval at which the trip unit 12 transmits status messages. On the other hand, if the trip unit 12 trips on analog override, the trip unit 12 does not transmit a final status message. After a trip, the display means 32 displays the first entry in the trip log for review by the user.

Figure 3:
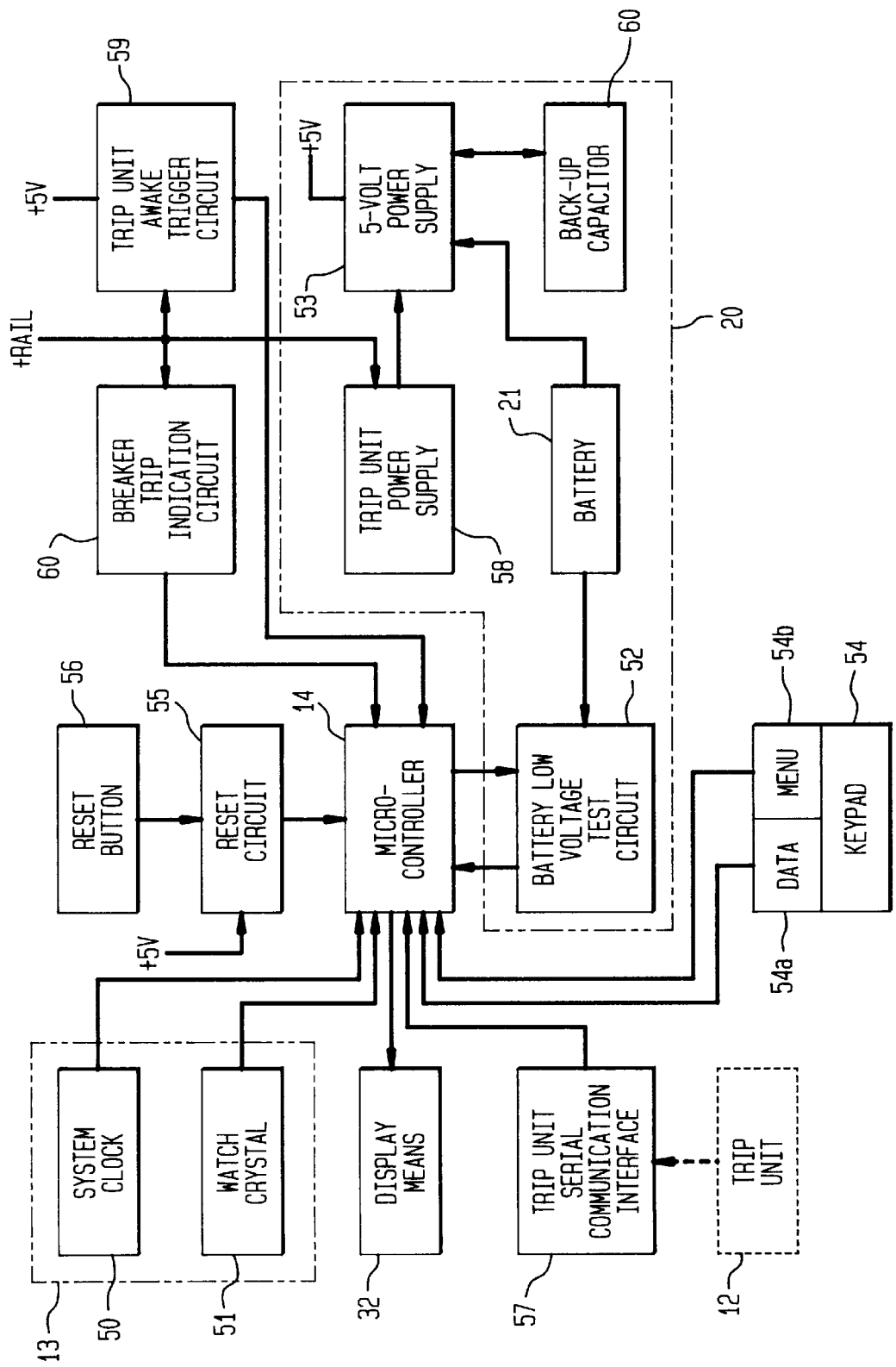
FIG. 3 is a block diagram illustrating the operating environment of the microcontroller.

FIG. 3 is a block diagram illustrating the operational environment of the microcontroller 14. The microcontroller 14 and the trip unit 12 are connected by a digital serial communication interface 57 through the serial port of microcontroller 14. If, as noted above, a MICROCHIP PIC16C77 microcontroller is chosen as microcontroller 14, then the serial communication interface 57 is connected to the serial communications port RX on the PIC16C77.

A reset circuit 55 is coupled to microcontroller 14 and a manual reset button 56 is coupled to the reset circuit 55. The MOTOROLA MC33464 micropower undervoltage sensing IC is a suitable reset circuit 55. The reset circuit 55 generates a reset signal for the microcontroller 14 should the system voltage Vdd fall below an established threshold. For a +5V system voltage, an exemplary threshold is 2.7V+/−0.7V. Manual reset button 56 allows the user to initiate a reset manually. If, as noted above, a MICROCHIP PIC16C77 microcontroller is chosen as microcontroller 14, then the reset circuit 55 is connected to the pin labeled MCLR* on the PIC16C77.

Keypad 54 is coupled to the microcontroller 14. Keypad 54 allows the user to interact with microcontroller 14 to set system parameters or to view the contents of the trip logs and the maximum parameter logs. In an exemplary embodiment, keypad 54 is provided with two buttons 54a and 54b labeled DATA and MENU, respectively. If the microcontroller 14 is programmed to implement a hierarchical menu structure, then the MENU button 54b is used to select among the different menus that constitute the structure, and the DATA button 54a is used to select among the data items displayed within each menu. If, as noted above, a MICROCHIP PIC16C77 microcontroller is chosen as microcontroller 14, then the keypad 54 is connected to the pins labeled RB4 and RB5 on the PIC16C77, with one of the buttons 54a or 54b mapped to one each of the pins RB4 or RB5.

Power supply 20, shown in dashed outline in FIG. 3 to indicate its constituent components, is coupled through two pins to microcontroller 14. A first pin receives the +5V Vdd supply voltage, and a second pin receives a signal indicating the status of battery 21. If a MICROCHIP PIC16C77 microcontroller is chosen as microcontroller 14, then power supply 20 is coupled to pin Vdd1 and to pin RB1, as explained in further detail below.

Power supply 20 includes five-volt power supply 53, battery 21, capacitor C, trip unit power supply 58 and low battery detection circuit 52. The five-volt power supply 53 is preferably implemented with a MOTOROLA MC78LC integrated circuit, which includes an input terminal, an output terminal, and a ground terminal (not shown in FIG. 3). The input terminal is coupled to the trip unit power supply 58, so that five-volt power supply 53 is powered by the trip unit power supply 58 when the +rail voltage is above a given threshold. The output terminal provides the +5V Vdd voltage supplied to microcontroller 14 and its peripheral circuitry. The ground terminal is coupled to circuit ground.

Battery 21 is coupled to provide voltage to five-volt power supply 53 should the +rail voltage from the trip unit power supply 58 fall below the minimum necessary to power five-volt power supply 53. Battery 21 is preferably an ULTRALIFE U9VL battery. Capacitor C is coupled by a bi-directional link to be charged by the five-volt power supply 53 and to hold up the RAM in microcontroller 14 while the battery 21 is changed. To perform this function, an exemplary rating of capacitor C is 0.047 F.

An exemplary low-battery detection circuit 52 is the NATIONAL LMC7211 integrated circuit, which includes terminals labeled V+, V−, IN, and OUT. If, as noted above, a MICROCHIP PIC16C77 microcontroller is chosen as microcontroller 14, then the V+ terminal of the low-battery detection circuit 52 is connected to the pin labeled Vdd1 on the PIC16C77. The V− terminal of the low-battery detection circuit 52 is connected to circuit ground, and the OUT terminal is connected to the pin labeled RB1. The low-battery detection circuit 52 senses the voltage supplied by the battery 21 through the IN terminal.

The trip unit awake trigger circuit 59 is coupled to microcontroller 14 and is also coupled to the +rail voltage supply from the trip unit 12. The trip unit awake trigger circuit 59 monitors the status of the +rail voltage from the trip unit 12 and notifies microcontroller 14 when that +rail voltage falls out of tolerance. If a MICROCHIP PIC16C77 is chosen as microcontroller 14, then the trip unit awake trigger circuit 59 is connected to the RB7 pin.

The breaker trip indication circuit 60 is coupled to receive the +rail voltage and is also coupled to microcontroller 14 to provide a signal indicating that the circuit breaker associated with the trip unit 12 has tripped. If a MICROCHIP PIC16C77 is chosen as microcontroller 14, then the breaker trip indication circuit 60 is connected to pin RB0.

The trip unit power supply 58 is coupled to receive the +rail supply voltage from the trip unit 12, and provides that supply voltage as a power supply to the five-volt power supply 53.

Display means 32 is coupled to the microcontroller 14, and an exemplary display means 32 is an LCD such as the BATRON 21630, coupled with a suitable driver such as the HITACHI HD44100. If, as noted above, a MICROCHIP PIC16C77 microcontroller is chosen as microcontroller 14, then the eight data pins of the BATRON 21630 are connected to the pins labeled RD0–RD7 on the PIC16C77.

A watch crystal 51 rated at 32.768 kHz is coupled to the microcontroller 14, and a system clock 50 including a crystal rated at 3.6864 MHz is coupled to the microcontroller 14. If, as noted above, a MICROCHIP PIC16C77 microcontroller is chosen as microcontroller 14, then the pins T1OS0 and T1OS1 of the PIC16C77 are connected to the watch crystal 51 and the pins OSC1 and OSC2 of the PIC16C77 are connected to the system clock 50.

The clock circuit 13 is implemented by connecting the 32.786 kHz watch crystal 51 to the microcontroller 14. The watch crystal 51 increments a first timer asynchronously to the 3.6864 MHz crystal, and generates an interrupt to update the real-time clock maintained by microcontroller 14. A first timer is used as the real-time clock and is preferably implemented as a 16-bit timer-counter. The first timer is configured to generate an interrupt every 4 seconds to update the system clock kept aboard the microcontroller 14. A second timer is used to poll the system switches and to function as the system timer, and is preferably configured as an 8-bit timer/counter. The second timer is configured to generate an interrupt every 10 milliseconds.

To conserve the life of the battery 21, the microcontroller 14 may be configured to operate in a low-power sleep mode, wherein the microcontroller 14 is not fully energized and awakes from sleep only when necessary. In an exemplary configuration, the microcontroller 14 enters sleep mode when there are no serial communications from the trip unit 12, no interrupts from the keypad 54, and no +rail voltage from the trip unit 12. When these three events occur, the microcontroller 14 enters the sleep mode after a given duration, for example 15 seconds. The display means 32 is turned off and appropriate interrupts are enabled to ensure that the microcontroller 14 awakes when necessary.

In an exemplary configuration, the microcontroller 14 awakes when a key on keypad 54 is pressed, a trip indication signal is received from the trip unit 12, serial communications from the trip unit 12 restart, the real-time clock timer overflows, or the +rail voltage from the trip unit 12 reappears. If the microcontroller 14 awakes because of a real-time clock timer overflow, the display means 32 will not be turned on, the real-time clock will be updated, and the microcontroller 14 will return to sleep. If any of the other awakening events besides the timer overflow occur, the display means 32 will be turned on to display the phase currents, unless a trip occurred before the microcontroller 14 went to sleep. If a trip occurred before the microcontroller 14 went to sleep, the first entry in the trip log will be displayed.

Although illustrated and described herein with reference to certain specific embodiments, the present invention is nevertheless not intended to be limited to the details shown. Rather, various modifications may be made in those details within the scope and range of equivalents of the claims and without departing from the invention.

What is claimed:

1. A device for recording temporal information related to a trip event of a circuit breaker equipped with a trip unit, the device comprising:
    a clock circuit for generating signals representing instantaneous temporal information;
    a microcontroller adapted to be coupled to the trip unit to receive signals from the trip unit indicating a circuit breaker trip event the microcontroller being coupled to the clock circuit to receive the instantaneous temporal information, the microcontroller associating a trip event with the instantaneous temporal information, the microcontroller generating output signals representing the trip event and the instantaneous temporal information associated with the trip event;
    a storage medium, coupled to the microcontroller, which receives and stores the output signals from the microcontroller indicating the trip event and the instantaneous temporal information associated with the trip event; and
    a power supply coupled to the clock circuit, to the microcontroller, and to the storage medium, the power supply coupled to receive power from the trip unit when the circuit breaker is closed;
    a battery, connected in parallel with the power supply such that, when the circuit breaker is open, the clock circuit, the microcontroller, and the storage medium automatically receive power from the battery.

2. The device of claim 1, wherein the clock circuit generates signals representing a time and a date.

3. The device of claim 1, further comprising means, adapted for coupling to the storage medium, for reading the given trip event and the temporal information associated with the given trip event from the storage medium.

4. The device of claim 1, wherein the power supply includes a capacitor having a capacitance sufficient to supply power to the clock circuit, the microcontroller, and the storage medium when the battery is disconnected.

5. The device of claim 1, wherein the clock circuit and the storage medium are implemented with the microcontroller on a single integrated circuit.

6. The device of claim 1, wherein the trip unit includes at least one current transformer, the device further comprising means for removably coupling the microcontroller to the trip unit, the removable means including means for providing a connection to the at least one current transformer of the trip unit.

7. The device of claim 6, wherein the coupling means configures the device as a plug-in module for selectively coupling the device to the trip unit.

8. A plug-in module for recording temporal information related to a trip event of a circuit breaker equipped with a trip unit, the plug-in module comprising:
    a clock circuit for generating signals representing the instantaneous temporal information;
    a microcontroller adapted for direct coupling to and for serial communication with the trip unit to receive signals from the trip unit indicating a circuit breaker trip event, the microcontroller coupled to the clock circuit to receive the temporal information, the microcontroller associating the circuit breaker trip event with the instantaneous temporal information related to the circuit breaker trip event, the microcontroller generating signals representing the circuit breaker trip event and the instantaneous temporal information associated with the circuit breaker trip event;

a storage medium coupled to the microcontroller to receive and store the signals representing the circuit breaker trip event and the instantaneous temporal information associated with the circuit breaker trip event; and means for removably coupling the microcontroller to the trip unit including means for receiving operational power from the trip unit.

9. The plug-in module of claim 8, wherein the microcontroller includes means for calculating the phase current passing through the circuit breaker, and further comprising means, coupled to the phase current calculating means, for displaying the phase current passing through the circuit breaker.

10. The plug-in module of claim 8, wherein the microcontroller includes means for calculating the average current passing through the circuit breaker, and further comprising means, coupled to the average current calculating means, for displaying the average current passing through the circuit breaker.

11. The plug-in module of claim 8, wherein the microcontroller includes means for calculating the ground current passing through the circuit breaker, and further comprising means, coupled to the ground current calculating means, for displaying the ground current passing through the circuit breaker.

12. The plug-in module of claim 8, wherein the microcontroller includes means for calculating the phase imbalance of the circuit monitored by the circuit breaker, and further comprising means, coupled to the phase imbalance calculating means, for displaying the phase imbalance.

13. The plug-in module of claim 8, wherein the microcontroller includes means for receiving a status of the trip unit, and further comprising means for displaying the status of the trip unit.

14. The plug-in module of claim 8, wherein the microcontroller includes means for calculating the current demand in the circuit monitored by the circuit breaker, and further comprising means, coupled to the current demand calculating means, for displaying the current demand.

15. The plug-in module of claim 8, wherein the microcontroller includes means for recording a time-stamped trip log in the storage medium, the trip log indicating at least one circuit breaker trip event along with a time-stamp associated with each circuit breaker trip event, and further comprising means, coupled to the microcontroller, for displaying the time-stamped trip log.

16. The plug-in module of claim 8, wherein the microcontroller includes means for recording a log of maximum values containing entries for a maximum value for at least one of a phase current, an average phase current, a ground fault current, a phase unbalance, and a current demand for a circuit monitored by the circuit breaker, and further comprising means for displaying the log of maximum values.

17. A method of recording temporal information related to at least one trip event of a circuit breaker equipped with a trip unit, comprising the steps of:

providing a real-time clock producing signals representing temporal information;

providing a microcontroller receiving the signals from the real-time clock representing the temporal information;

coupling the microcontroller and the real-time clock to receive power and a trip unit status signal from the trip unit;

monitoring the trip unit status signal for a trip event;

passing a signal between the trip unit and the microcontroller indicating a type of trip event;

generating a temporal marker corresponding to the trip event;

associating the trip event with the temporal marker corresponding to the trip event; and storing the trip event and the temporal marker corresponding to the trip event in a storage medium.

18. The method of claim 17, further comprising the step of reading the trip event and associated temporal marker from the storage medium.

19. The method of claim 17, wherein the step of generating a temporal marker includes generating a signal representing a time and a date of the trip event.

20. A plug-in module for recording temporal information related to a trip event of a circuit breaker equipped with a trip unit, the plug-in module comprising:

a clock circuit for generating signals representing the temporal information;

a microcontroller adapted for direct coupling to and for serial communication with the trip unit to receive signals from the trip unit indicating a circuit breaker trip event, the microcontroller coupled to the clock circuit to receive the temporal information, the microcontroller associating the circuit breaker trip event with the temporal information related to the circuit breaker trip event, the microcontroller generating signals representing the circuit breaker trip event and the temporal information associated with the circuit breaker trip event;

a storage medium coupled to the microcontroller to receive and store the signals representing the circuit breaker trip event and the temporal information associated with the circuit breaker trip event;

means for coupling the microcontroller to receive power from the trip unit;

wherein the microcontroller includes:
  means for calculating the phase current passing through the circuit breaker;
  means for calculating the average current passing through the circuit breaker;
  means for calculating the ground current passing through the circuit breaker;
  means for calculating the phase imbalance of the circuit monitored by the circuit breaker;
  means for receiving a status of the trip unit;
  means for calculating the current demand in the circuit monitored by the circuit breaker; and further comprising display means coupled to the microcontroller for displaying the temporal information associated with the circuit breaker trip event, the phase current, the average current, the ground current, the phase imbalance, the status of the trip unit, and the current demand.

* * * * *